United States Patent [19]
Fukuzumi

[11] Patent Number: 5,257,476
[45] Date of Patent: Nov. 2, 1993

[54] GROWING VEGETATION FOR THE PURPOSE OF INSTALLING VERDURE ON BUILDINGS

[76] Inventor: Yutaka Fukuzumi, 34-1, Kami-Seya-Machi Seya-Ku, Yokohama-Shi, Kanagawa, Japan

[21] Appl. No.: 977,066

[22] Filed: Nov. 16, 1992

[30] Foreign Application Priority Data

Feb. 21, 1992 [JP] Japan .................................. 4-070126

[51] Int. Cl.$^5$ .............................................. A01G 9/02
[52] U.S. Cl. ....................................................... 47/83
[58] Field of Search ................................ 47/82, 83, 58

[56] References Cited

U.S. PATENT DOCUMENTS

| 4,785,577 | 11/1988 | Lederbauer | 47/83 |
| 4,961,284 | 10/1990 | Williams | 47/83 |

FOREIGN PATENT DOCUMENTS

| 2705375 | 6/1978 | Fed. Rep. of Germany | 47/83 |
| 2646875 | 10/1978 | Fed. Rep. of Germany | 47/83 |
| 2026830 | 2/1980 | Fed. Rep. of Germany | 47/83 |
| 3627794 | 2/1988 | Fed. Rep. of Germany | 47/83 |
| 3914257 | 11/1989 | Fed. Rep. of Germany | 47/83 |
| 2236669 | 4/1991 | Fed. Rep. of Germany | 47/83 |
| 2237964 | 5/1991 | United Kingdom | 47/70 |

*Primary Examiner*—Terry Lee Melius
*Assistant Examiner*—Joanne C. Downs
*Attorney, Agent, or Firm*—Robert E. Burns; Emmanuel J. Lobato

[57] ABSTRACT

Verdure is installed on buildings by stacking bags made of unwoven polyester fabric and filled with synthetic light-weight soil against the outer wall of the building, or against the outside of a window that is to be blocked out. The bags are stacked several bags high and are retained by a stainless steel lattice. The roots of coniferous evergreen plants are inserted between the bags and grow into the soil in the bags. The plants grow outside the lattice and cling to the lattice to form greenery covering the side of the building or the window.

10 Claims, 4 Drawing Sheets

GROWING VEGETATION FOR THE PURPOSE OF INSTALLING VERDURE ON BUILDINGS

FIELD OF THE INVENTION

This invention relates to a process for installing verdure on the outside of buildings. That is, at the location of a proposed greenery of a building, several rows of soil-bags are laid, stacked several bags high, supported on the outer side by lattice fence, to prepare a soil-bed between the side of the building and the fence. Roots of the vegetation to form the verdure are inserted and planted between the rows of soil-bags, to spread their branches outside of the fence.

A special application of this Invention would include buildings such as department stores, where it may be desirable to cut-off sunlight coming through a window, to protect displayed goods. In such a case, the soil-bed would be prepared in the space between the window frame and the outer wall of the building, in which vegetation would be grown.

BACKGROUND OF THE INVENTION

A conventional method to install verdure on buildings was to utilize vines, which with hair-like roots attach themselves to walls. This method, however, had problems such as listed below:

Vines spread vertically upward from the ground.

Vines grow from the earth, restricting their use as forming verdure on buildings.

Vines are unsuitable for creating greenbelts which is the purpose of this Invention.

SUMMARY OF THE INVENTION

To make a fundamental change of idea underlining the conventional technology mentioned above, this Invention utilizes the methods and technologies outlined below.

At the space of a building where verdure is demanded, several rows of soil-bags are laid, stacked several bags high, supported on the outside by lattice fence, to prepare a soil-bed between the side of the building and the fence. Roots of the vegetation to form the verdure are inserted and planted between the rows of soil-bags, to spread their branches outside the fence, which are characteristics of this Invention, which is a facility to grow vegetation for the purpose of installing verdure on buildings. Further, to prepare a soil-bed, unwoven polyester type sheet is used to fabricate the bags, and synthetic lightweight soil is used to fill the bags.

BRIEF DESCRIPTION OF DRAWINGS.

The essence of the invention will be more fully understood from the following description of a preferred example illustrated in the accompanying drawings in which.

DESCRIPTION OF PREFERRED EMBODIMENTS

Figure 1:
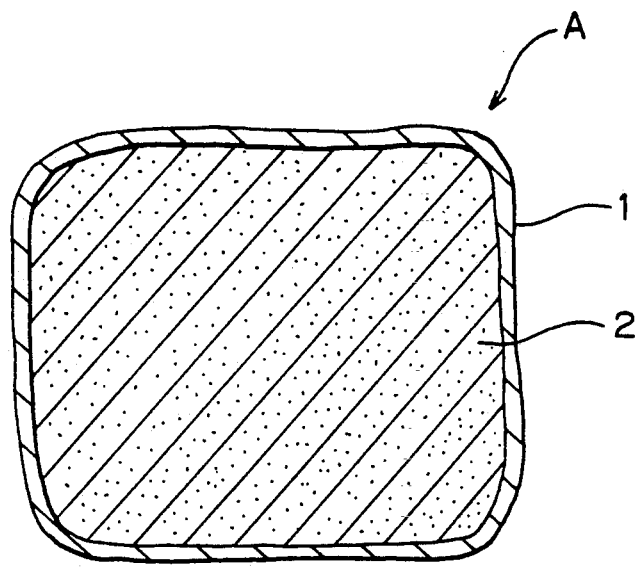
FIG. 1 is a cross sectional view of a filled soil bag.
Figure 2:
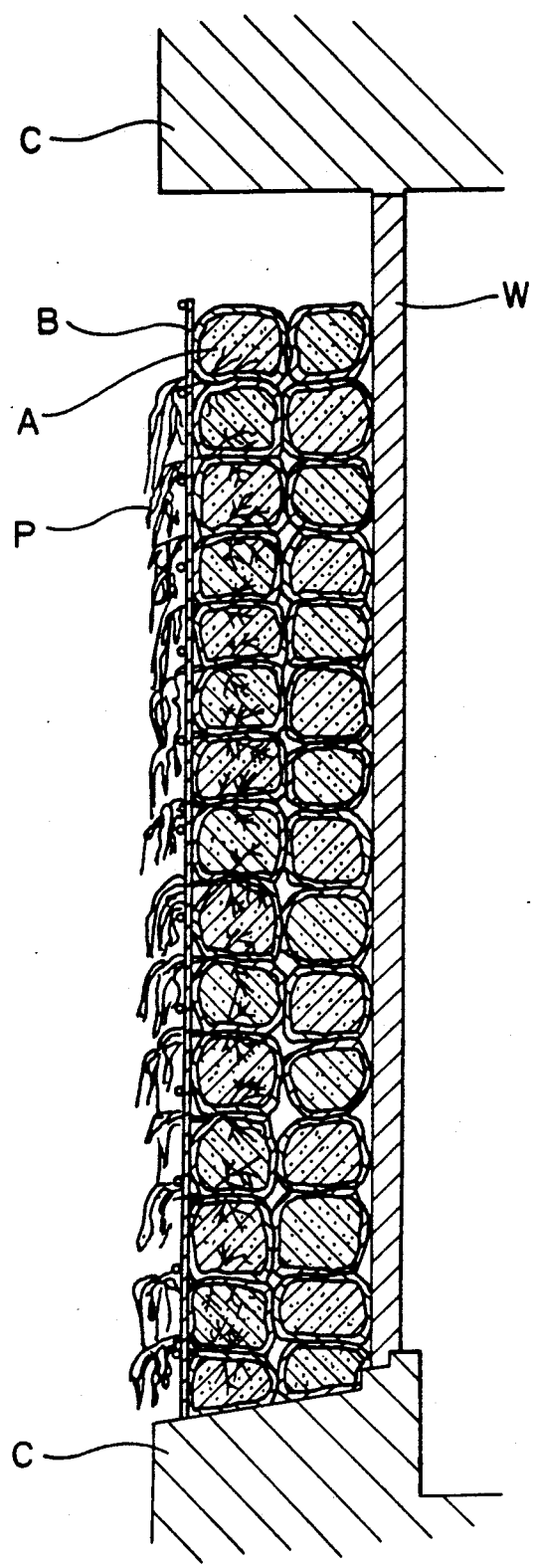
FIG. 2 is a cross sectional view of soil bags stacked outside a window of a building.
Figure 3:
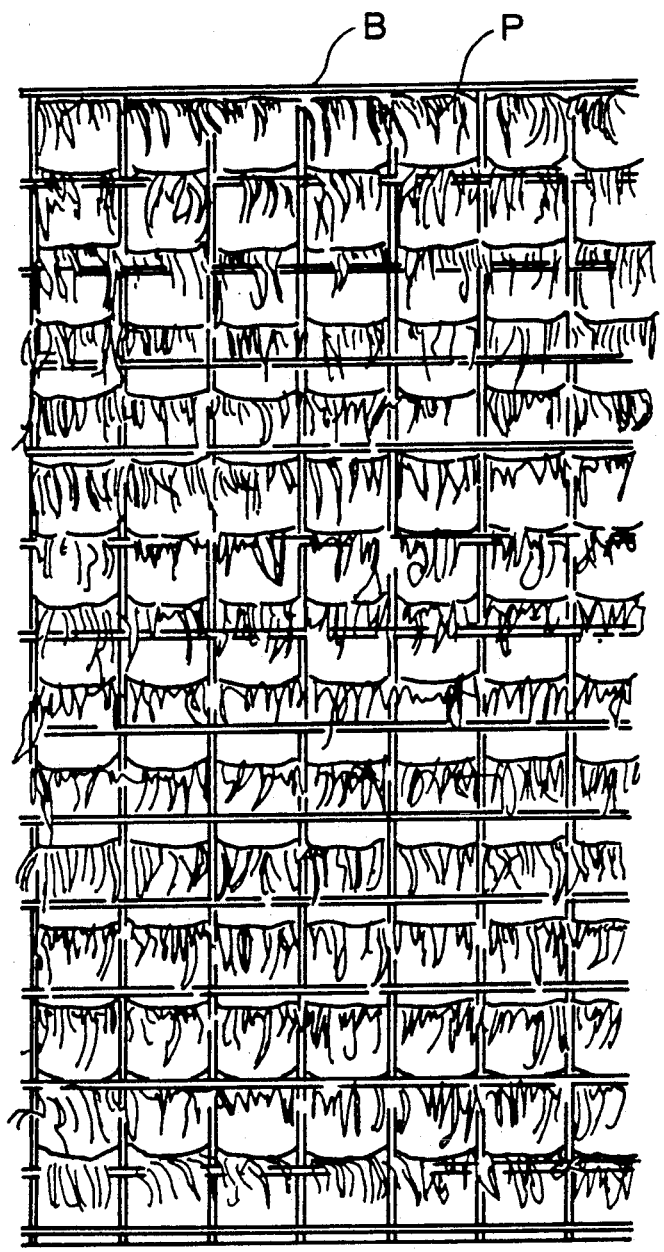
FIG. 3 is a schematic elevational view of soil bags installed outside a window of a building.
Figure 4:
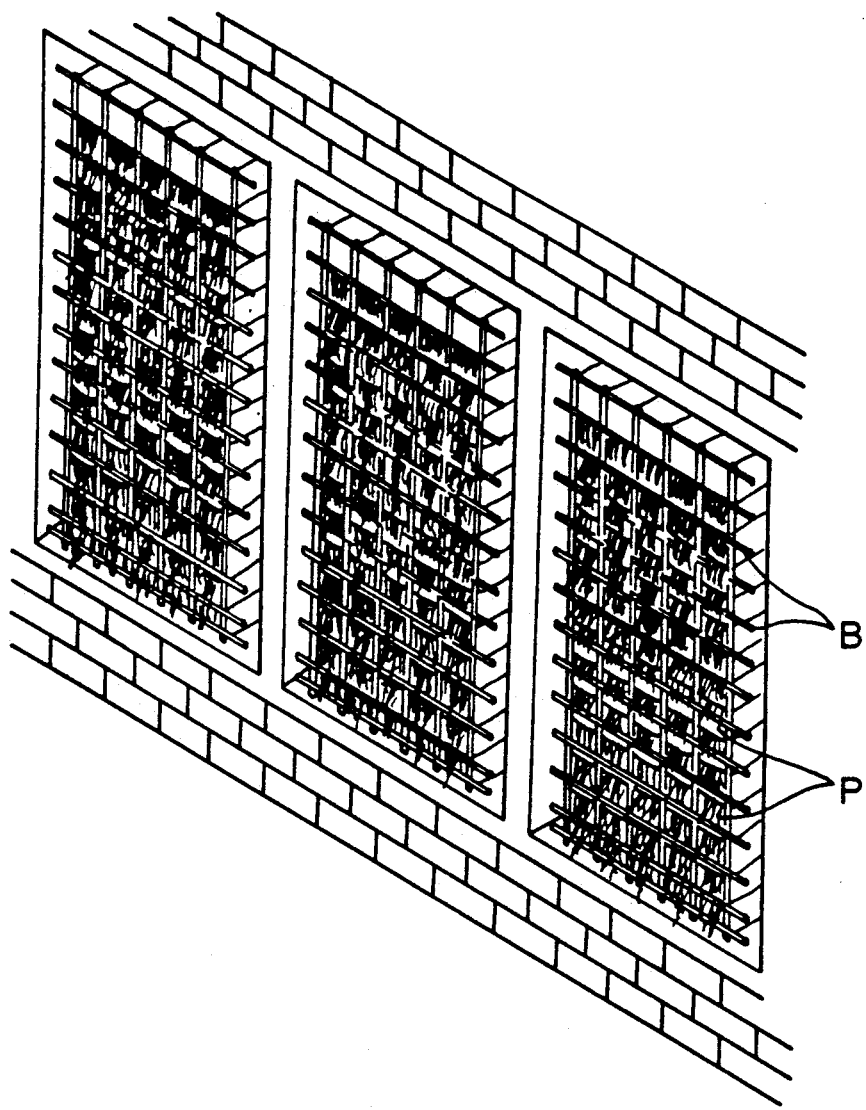
FIG. 4 is a perspective view showing verdure installed outside of three windows of a building.

Soil-bag (A) consists of bag proper (1), and soil (2) to be filled in the bag. For the bag proper (1), unwoven polyester type sheet of 1.5 mm thickness is used, which has been proven by tests to possess sufficient porosity to allow water to pass through and roots to enter. For the soil (2), synthetic lightweight soil is used.

Soil-bags (A), mentioned above, are stacked on the outside of a window, and fence (B) to support these bags is a lattice made of non-corrosive stainless steel. Coniferous evergreens (P) are the suitable plants, because of their suitable characteristics to maintain verdure throughout the year, and to tend to cling to the fence (B).

Greenery space, where a soil-bed is to be prepared using the above mentioned materials, is the space in front of the window (W) of the building.

The frame of window (W) is fitted 460 mm inside of the outer wall surface (C) of the building. The size of this frame is 3,000 mm (width) × 1,500 mm (height).

In the process of stacking the soil-bags, to protect window (W), a protective board could be used to cover the surface. The bag proper (1) of soil-bag (A) of this invention, however, is made of soft unwoven polyester type sheet, which would also serve to protect the glass surfaces and, therefore, soil-bags (A) will be stacked, 2 rows, 15 high, along the window (W). In front of the soil-bags (A), a lattice fence (B) is erected, anchored suitably to the side of the building. Thus, a soil-bed consisting of soil-bags (A), laid and stacked between the window (W) and fence (B), is prepared.

After the soil-bed is prepared, the coniferous evergreens (P) are planted by inserting their roots in between the soil-bags (A).

Although this is not shown in the drawings, an automatic watering system, controlled by a timer, is installed on the soil-bed for watering.

The example described above is the case of preparing a soil-bed along the front of a window. This method can be applied to the ceiling of opera house type architecture, or ceiling of a grand hall. Finding a space on the ceiling to prepare a soil-bed, a fence would be anchored parallel to the ceiling, soil-bed would be prepared by stacking soil-bags, in between the ceiling and the fence, and a given vegetation is planted by inserting the roots in between the soil-bags, to allow the plants to dangle downward to form verdure.

In case of a need to prepare a soil-bed directly on the wall of a building, it is possible to fabricate a suitable frame-box, fitted with fence on the front, and the soil-bags are stacked within the box, which is anchored to the wall. Desired vegetation is planted in the soil-bed, to form verdure.

This invention will be put into actual use, as explained in the foregoing, and the hair-like roots of the main roots of the vegetation inserted between soil-bags would enter the soil-bags through the pores of the unwoven polyester type sheets. Since this unwoven sheet is soft, as the roots develop, the pores would expand, and the vegetation would become firmly rooted in the soil.

In case of coniferous evergreens (P), about nine (9) saplings are planted in each square meter of soil.

Coniferous evergreens (P) will grow in time, and would show outwardly through the opening of the lattice fence (B). Further on, the coniferous evergreens (P) would cling to the fence (B) and spread out, to form verdure in the space before the rectangular window (W), 3,000 mm (width) × 1,500 mm (height). This would be repeated on each adjacent window, all of which would form a greenbelt at the particular level of the building.

This invention consists of the foregoing procedures and possesses the following potential merits:

(1) Beginning by simply preparing a soil-bed for growing vegetation at a particular space of a building, and then growing vegetation thereon, it becomes possible to create verdure there.

(2) The unwoven polyester type sheet is used to fabricate the bag of the soil-bag and, therefore, even in case the side of the building is used as one side of the built-up soil-bed, as the side of the building comes in contact with soft materials (used for the bags), the building, including the windows, will be safe from breakage and/or soiling.

Considering these effects and merits, it may be said that this is a worthwhile invention, which has brought forth a new facility to install verdure on buildings.

What I claim is:

1. A process for installing verdure on the outside of a building having an outside wall, comprising the steps of:

filling a plurality of bags with soil;

stacking said soil-filled bags against said outside wall of said building in a stack which is a plurality of bags high;

erecting a lattice fence outside of said stacked bags to support said bags against said outside wall of said building;

inserting roots of plants in between bags of said stacked soil-filled bags, and watering said plants and said soil-filled bags to promote growth of said plants.

2. A process according to claim 1, in which said bags are made of unwoven polyester-type fabric.

3. A process according to claim 2, in which said fabric of which said bags are made has a thickness of the order of 1.5 mm.

4. A process according to claim 1, in which the soil with which said bags are filled is lightweight synthetic soil.

5. A process according to claim 1, in which said plants are coniferous evergreen plants.

6. A process for protecting and obscuring a window in an outer wall of a building, which window is spaced inwardly of a plane of an outer surface of said outer wall, said process comprising the steps of:

filling a plurality of bags with soil;

stacking said soil-filled bags against the outside of said windows and between said window and said plane of the outer surface of said outer wall, said bags being stacked a plurality of bags high, erecting a lattice fence outside of said stacked soil-filled bags to support said bags against said window and anchoring said fence to said outer wall;

inserting the roots of plants in between bags of said stacked soil-filled bags, and watering said plants and said soil-filled bags to promote growth of said plants.

7. A process according to claim 6, in which said bags are made of unwoven polyester-type fabric.

8. A process according to claim 7, in which said fabric of which said bags are made has a thickness of the order of 1.5 mm.

9. A process according to claim 6, in which the soil with which said bags are filled is lightweight synthetic soil.

10. A process according to claim 6, in which said plants are coniferous evergreen plants.

* * * * *